I. N. RICHARDSON,

Assignor to I. W. Richardson.

PLAYING-CARDS.

No. 7,755. Reissued June 19, 1877.

WITNESSES.

Samuel D. Kelley.

James A. Todd.

INVENTOR.

Isaac N. Richardson

By Porter & Hutchinson Attys.

UNITED STATES PATENT OFFICE

IVORY N. RICHARDSON, OF MALDEN, MASSACHUSETTS, ASSIGNOR TO IVORY W. RICHARDSON.

IMPROVEMENT IN PLAYING-CARDS.

Specification forming part of Letters Patent No. 155,752, dated October 6, 1874; reissue No. 7,755, dated June 19, 1877; application filed March 13, 1876.

DIVISION No. 1.

*To all whom it may concern:*

Be it known that I, IVORY N. RICHARDSON, late of Revere, but now of Malden, in the Commonwealth of Massachusetts, have invented an Improvement in Playing-Cards, of which the following is a specification:

This invention relates to an improvement in that class or kind of cards known as "playing-cards," which are divided into suits or subdivisions, and having upon each card certain emblems, faces, or pictures, which indicate the suit to which such card belongs, as also its size or value relatively to the other cards in the pack; and the invention consists in combining the distinguishing color for each suit of such cards—such, for instance, as black for "spades," red for "hearts," green for "clubs," and yellow for "diamonds"—with the figures, numerals, signs, or other indicators placed at the edge or border of the card, used to show the size or value of the card, whereby the player, as soon as his eye catches such numeral or indicator upon any card, will by the color and indicator at once know of which suit it constitutes a part, and what is its size or value, without, as heretofore, discerning the configuration or kind of the emblems or characters it bears or the number thereof.

Figure 1:
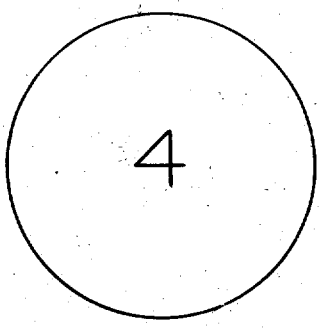
Figure 2:
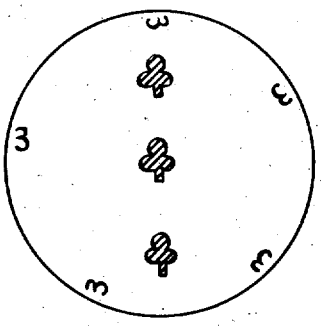
Figure 3:
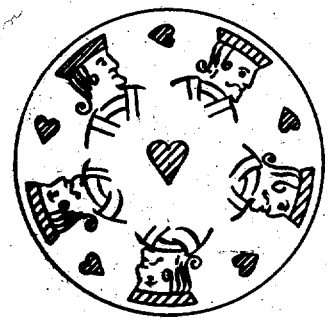

In the accompanying drawings, Figure 1 represents the four of spades. Fig. 2 represents the three of clubs. Fig. 3 represents the jack or knave of hearts, and Fig. 4 represents the king of diamonds.

Figure 4:
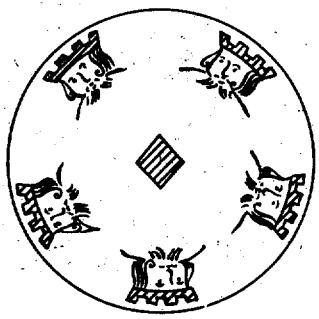

In said Fig. 1 the numeral or figure 4 is represented in black. This color indicates that this card belongs to the suit known as "spades," while the numeral indicates the size or value of the card relatively to the other cards in the pack.

Fig. 2 shows three of the emblems known as "clubs" arranged across the center of the card, while the numeral or figure 3 is displayed at several points around or near the edge of the card. By coloring these numerals alone with the color selected as the characteristic suit-color, or both the numerals and emblems—for example, green—the player, observing either of the numerals, would, by its color, know that the card belonged to the suit called "clubs," while the character of the figure would indicate the size or value of such card.

In Fig. 3 the emblem known as a heart is placed around the card near its edge at several points, and the heads and faces representing the jack are similarly displayed upon the card. By coloring these heads or faces, or the cap on the head, with the adopted indicating or characteristic color (red) the player would, without the aid or use of the emblems, at once know to which suit the card belonged, and its character and value.

In Fig. 4 the heads or faces of the "king" are shown arranged around the card near its edge, but with the emblem of the diamond omitted, except in the center, and by coloring the face or crown of the "king" with the adopted indicating or characteristic color (yellow) the player, by observing the crown and its color, can at once determine as to which suit the card constitutes a part.

Although preferring a round card, yet I propose to make them of any desired form, nor do I limit myself to any prescribed color for either suit of cards, so that each suit of the pack be of a different color; yet I prefer the colors as above described.

The faces may be of any desired colors or shades, while the accompanying emblems are of the indicating colors.

Both the emblems and border-numerals may be employed, as shown in Fig. 2, or the numerals alone. The emblematic cards may, instead of having the emblems printed or shown thereon, be indicated solely by number and color, as shown in Fig. 1, in which case either the ground or the numeral may be of the characteristic color, and the numerals or signs may be arranged around the border; or they may be both in the center and around the border. I do not claim a round card, nor do I claim, broadly, the employment of an indicating-color for each suit of cards in the pack, or the combination of the indicating-numerals with the emblems; but

What I do claim is—

1. Playing-cards the face or court cards in each of the suits whereof are distinguished by an indicating color of the regalia or head-dress of the effigy or designating character of the card.

2. Playing-cards the suit of the emblematic or spot cards whereof is shown by the indicating or suit color of a numeral or figure, which numeral or figure also shows the size or value of the card, whereby the player, as soon as he recognizes such figure or numeral, can know by the color and character thereof both the suit and size or value of the card, substantially as described and shown.

IVORY N. RICHARDSON.

Witnesses:

WM. H. HART,

EUGENE HUMPHREY.